Patented Dec. 8, 1925.

1,564,210

UNITED STATES PATENT OFFICE.

ORIN D. CUNNINGHAM, OF BUFFALO, NEW YORK, ASSIGNOR TO NATIONAL ANILINE & CHEMICAL COMPANY, INC., OF NEW YORK, N. Y., A CORPORATION OF NEW YORK.

MANUFACTURE OF 2-AMINO ANTHRAQUINONE.

No Drawing. Application filed June 7, 1921. Serial No. 475,817.

*To all whom it may concern:*

Be it known that I, ORIN D. CUNNINGHAM, a citizen of the United States, residing at Buffalo, in the county of Erie, State of New York, have invented certain new and useful Improvements in the Manufacture of 2-Amino Anthraquinone, and I do hereby declare the following to be a full, clear, and exact description of the invention, such as will enable others skilled in the art to which it appertains to make and use the same.

This invention relates to the manufacture of 2-aminoanthraquinone from anthraquinone-2-sulphonic acid, whereby the yield is materially increased as compared with methods heretofore proposed.

It has heretofore been proposed to make 2-aminoanthraquinone by treating the sodium salt of anthraquinone-2-sulphonic acid (silver salt) with aqueous ammonia in the presence of barium chloride, and it is claimed that a yield of about 74% of the theoretical can be obtained in this way.

I have found that a greatly increased yield of 2-aminoanthraquinone, amounting to as much as 82% or more of the theoretical, can be obtained by adding ammonium chloride, in addition to barium chloride, in the treatment of anthraquinone-2-sulphonic acid with aqueous ammonia. The yields which I have obtained in this way are much higher than those obtainable by any method heretofore proposed, in so far as I am aware.

The invention will be further illustrated by the following specific example:

60 lbs. of "silver salt" (sodium salt of anthraquinone-2-sulphonic acid) are placed with 47.5 lbs. of crystallized barium chloride, 45 lbs. ammonium chloride and 1100 lbs. of 23% ammonia water in an iron autoclave and heated with agitation to 180–185° C., for 18–20 hrs. At the end of that time the excess of ammonia is allowed to escape from the autoclave and is recovered. The crude 2-aminoanthraquinone is then filtered out and purified by boiling successively with dilute soda ash solution, with dilute hydrochloric acid, and with water.

In the above example, the proportions can be somewhat varied.

Instead of starting with the sodium salt of anthraquinone-2-sulphonic acid (silver salt), the barium salt (prepared, for example, by adding a soluble barium salt to a mixture of solution containing silver salt) can be similarly used. The barium salt, separately prepared, can thus be heated with a further amount of soluble barium salt, ammonia water, and ammonium chloride, in a manner similar to that indicated in the above specific example.

I claim:

1. The method for the manufacture of 2-aminoanthraquinone, which comprises subjecting anthraquinone-2-sulphonic acid to the action of ammonia water in the presence of a soluble barium salt and of ammonium chloride.

2. The method for the manufacture of 2-aminoanthraquinone, which comprises heating under superatmospheric pressure anthraquinone-2-sulphonic acid with ammonia water at a temperature of 150° to 200° C. in the presence of a soluble barium salt and of ammonium chloride.

3. The method for the manufacture of 2-aminoanthraquinone, which comprises heating anthraquinone-2-sulphonic acid with ammonia water at a temperature of 150° to 200° C. in the presence of barium chloride and of ammonium chloride.

4. The method for the manufacture of 2-aminoanthraquinone, which comprises heating under superatmospheric pressure the sodium salt of anthraquinone-2-sulphonic acid with ammonia water at a temperature of 180° to 190° C. in the presence of barium chloride and of ammonium chloride for a period of 15 to 20 hours.

5. In the production of 2-amino-anthraquinone by subjecting anthraquinone-2-sulphonic acid to the action of aqueous ammonia under superatmospheric pressure, the improvement characterized by causing the reaction to occur in the presence of barium chloride and of ammonium chloride.

In testimony whereof I affix my signature.

ORIN D. CUNNINGHAM.